United States Patent

Otsuji

[11] 4,153,407
[45] May 8, 1979

[54] CURING APPARATUS

[76] Inventor: Masaaki Otsuji, 41-2, Oasa-Yoshikawa, Higashinose-mura, Toyono-gun, Osaka, Japan

[21] Appl. No.: 890,019

[22] Filed: Mar. 24, 1978

[30] Foreign Application Priority Data

Mar. 24, 1977 [JP] Japan .................. 52-33069

[51] Int. Cl.² .................. B29H 9/08; B29F 3/10
[52] U.S. Cl. .................. 425/446; 425/97; 425/113; 425/325
[58] Field of Search .................. 425/97, 113, 122, 325, 425/446, 379 R

[56] References Cited

U.S. PATENT DOCUMENTS

| | | | |
|---|---|---|---|
| 2,616,126 | 11/1952 | Merck et al. | 425/325 X |
| 2,688,768 | 9/1954 | Rayburn | 425/97 X |
| 3,461,490 | 8/1969 | Cottingham | 425/113 |
| 3,551,640 | 12/1970 | Duke | 425/113 X |
| 3,901,633 | 8/1975 | Chrismann et al. | 425/113 X |
| 4,080,131 | 3/1978 | Bahder et al. | 425/113 |
| 4,091,064 | 5/1978 | Kakinuma et al. | 425/97 X |

Primary Examiner—J. Howard Flint, Jr.
Attorney, Agent, or Firm—Armstrong, Nikaido, Marmelstein & Kubovcik

[57] ABSTRACT

A curing apparatus for continuously producing shaped articles of cross-linked polymeric material in which a curing tube is adapted to be heated by the direct passage of electric current in the tube. One terminal of a power supply is connected to the opposite ends of the voltage applying section to be heated, while the other terminal of the power supply is connected to the tube at a position where the voltage applying section is divided into two so that one portion on the inlet side of the tube is lower in electric resistance than the other portion on the outlet side thereof. The increased heat generation resulting from the lower electric resistance of the inlet-side portion maintains the tube inlet portion at a high temperature, despite its tendency toward a lower temperature due to continuous introduction of the low-temperature polymeric material to be cured, to thereby achieve an improved production efficiency.

4 Claims, 3 Drawing Figures

CURING APPARATUS

BACKGROUND OF THE INVENTION

1. Field of the Invention

This invention relates to a curing apparatus suitable for the production of shaped articles of cross-linked polymeric material such as cross-linked polymeric material insulated wires, and more particularly to a curing apparatus in which a curing tube is heated by the direct passage of electric current in the tube.

2. Description of the Prior Art

It is already known to cross-linked a polymeric material by passing the material through a curing tube with a.c. or d.c. voltage applied across the terminals at the opposite ends of the tube and heating the material with the heat resulting from the electric resistance of the tube as disclosed in U.S. Pat. Nos. 2,616,126; 2,581,769, etc. This method of heating is more advantageous in equipment cost and operation procedure than other methods in which the curing tube is heated with a hot fluid circulating through a jacket as disclosed in U.S. Pat. No. 3,054,142 or with a band heater as used in U.S. Pat. No. 3,928,525. The method, nevertheless, involves the problem that the uncured polymeric material continuously fed at a low temperature (usually 100° to 130° C.) to the curing tube during curing operation absorbs part of the heat of the curing tube, reducing the temperature of the curing tube at and near its inlet. Such a reduction in the temperature of the curing tube will retard the cross-linking reaction velocity of the polymeric material, consequently leading to a reduced production efficiency. When the curing tube is a so-called long-land die, the polymeric material to be cross-linked advances along the inner surface of the long-land die with a thin layer of the lubricant provided therebetween while absorbing an especially large amount of heat, possible decreasing the temperature of the die at its inlet to a level nearly 80° C. lower than the highest temperature at the outlet thereof. Although it appears possible to compensate for the drop in the curing temperature attendant on the conventional heating method of the above voltage application type by impressing higher voltage across the terminals to ensure increased heat generation, this is practically infeasible since the greatly elevated temperature in the vicinity of the tube outlet is likely to thermally degrade the polymeric material.

The curing tube, which is as long as several meters to several tens of meters, is usually composed of a number of short tubular segments connected together in series. If the tube involves a difference in electric resistance among tubular segments or an insufficient electrical connection at the end-to-end joint between segments, application of voltage would produce a low-temperature portion or an abnormally hot portion longitudinally of the tube. Such a low-temperature portion, if created, also would reduce the operation efficiency.

SUMMARY OF THE INVENTION

The object of this invention is to provide a curing apparatus in which a curing tube can be heated by the direct application of voltage thereto without, or with a reduced likelihood of, involving a local low-temperature portion during the curing operation and which is therefore capable of producing cross-linked shaped articles with improved efficiency.

The curing apparatus of this invention comprises a curing tube, means for heating the curing tube by the direct passage of electric current in the tube over part or the whole of its length, and a power supply provided for the heating means and having one terminal connected to the opposite ends of the voltage applying section of the tube and the other terminal connected to the tube at a position where the voltage applying section is divided into one portion on the inlet side of the tube and the other portion on the outlet side thereof, the inlet-side portion being lower than the outlet-side portion in electric resistance.

DESCRIPTION OF THE PREFERRED EMBODIMENTS

Figure 1:
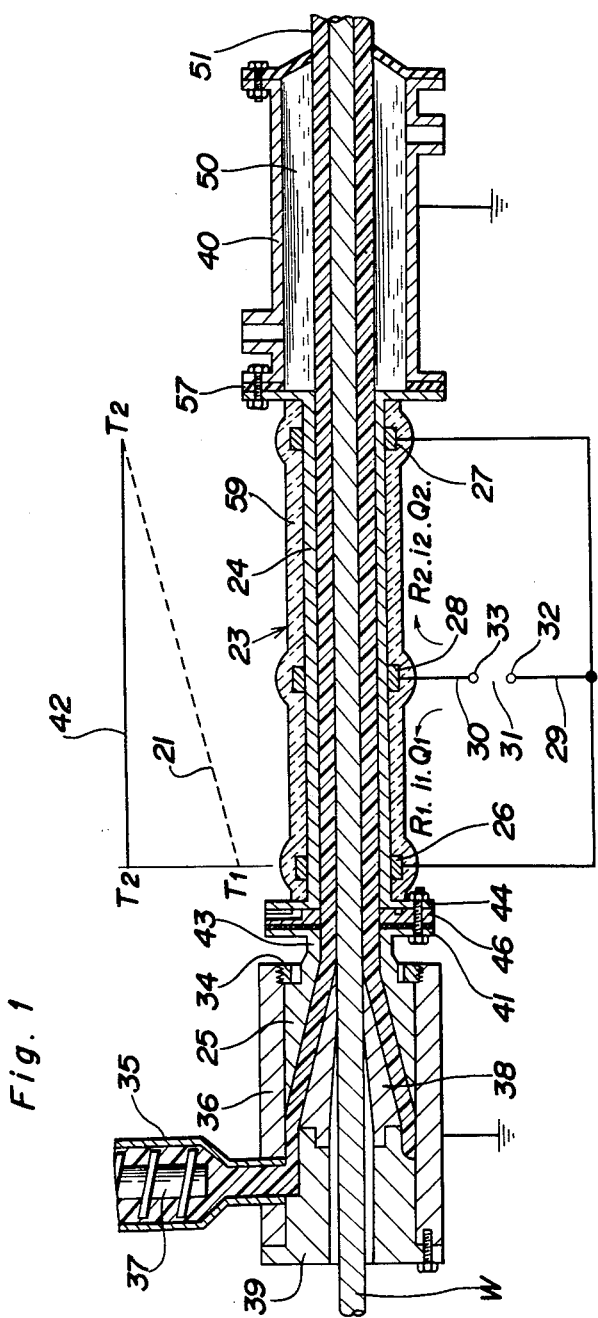
FIG. 1 is a cross-sectional view illustrating an embodiment of this invention.

FIG. 1 shows a curing apparatus comprising a curing tube which is a so-called long-land die for forming and cross-linking or curing uncured polymeric materials by heating.

Figure 2:
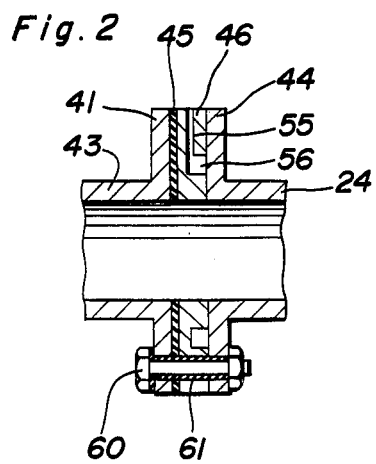
FIG. 2 is a detailed view in section showing the connection between flanges 41 and 44 shown in FIG. 1.
Figure 3:
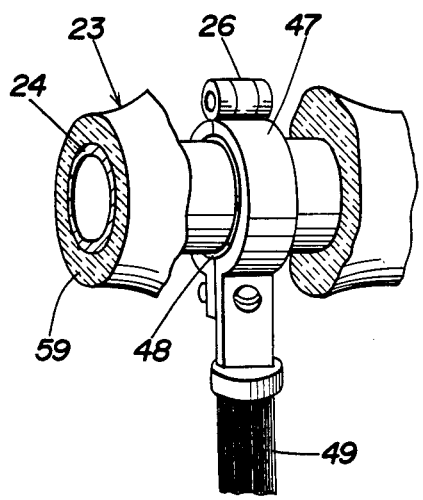
FIG. 3 is a detailed perspective view showing the terminal 26, (and also 27 and 28) shown in FIG. 1.

With reference to FIGS. 1 to 3, a curing apparatus 23 is in the form of an assembly of a long-land die 24 and a tapered portion 25 having a land portion 43. The tapered portion 25 and the long-land die 24 are connected together by flanges 41 and 44 at their opposed ends with a lubricant applicator 46 and an insulating layer 45 interposed therebetween. The insulating layer 45 is made of heat-resistant electrically insulating material such as polytetrafluoroethylene, polyamide or polyimide. The bores of the flanges 41 and 44 for passing a fastening bolt 60 therethrough is also provided with a heat-resistant insulating layer 61. the insulating layer 45 is fully serviceable if having a usual small thickness of about 0.5 to about 5 mm. The long-land die 24 has a uniform electric resistance longitudinally thereof. Some variations in electric resistance are allowable if occurring with substantially uniform distribution longitudinally of the long-land die, and the die can then be handled as having a uniform electric resistance for actual operation.

During the processing of the polymeric material, a lubricant flows through a channel 55 within the applicator 46 into an annular reservoir 56, from which the lubricant passes through a slit between the applicator 46 and the flange 44 to the inner surface of the long-land die 24. Useful lubricants are usual natural or synthetic lubricants. When the polymeric material to be cross-linked contains an organic peroxide to be used as cross-linking agent, it is preferable to use a lubricant disclosed in U.S. Pat. No. 3,928,525.

The long-land die 24 is externally provided with terminals 26 and 27 at its opposite ends and with an intermediate terminal 28 at a position away from the midpoint between the two terminals 26 and 27 toward the terminal 26. The terminal 26 (and also terminals 27 and 28) is composed of a clamp 47 having opposed fastening portions one of which alone is elongated and an adapter 48 consisting of a pair of half pieces. Those terminals 26, 27 and 28 are tightly fastened to the outer surface of the long-land die 24 by the clamp 47. A bundle of flexible conductors 49 is connected to the outer end of the elongated fastening portion of the clamp 47. The flexible conductor bundles extending from the terminals 26 and 27 are connected to a bus bar 29 connected to one terminal 32 of an a.c. or d.c. power supply 31, while the flexible conductor bundle connected to the intermediate terminal 28 is connected by a bus bar 30 to the other terminal 33 of the power supply 31. Care must be taken to avoid improper contact between the terminals 26, 27, 28 and the long-land die 24; otherwise, local heat generation would take place at the contact portion owing to an increased electric resistance, or unstable power supply to the long-land die 24 could result. However, such a trouble is avoidable with the use of the terminal shown in FIG. 3 by tightly fastening the clamp 47 with the adapter 48 fully held in pressing contact with the die surface. Improved results are attainable by maintaining the adapter for each of the terminals 26 and 27 in contact with the die 24 over an area at least about 20 times the cross sectional area of the die 24 and further by maintaining the adapter for the terminal 28 in contact with the die 24 over an area at least about 40 times the cross sectional area. The long-land die 24 considerably expands on heating with the application of voltage, varying the distances between the terminals 26 and 28 and between the terminals 28 and 27. It is therefore desirable to connect the power supply with flexible conductors.

The heating section of the long-land die 24 is covered with a thermal insulating layer 59 of thermal insulating material such as asbestos or glass cloth. Precaution should be taken in providing the insulating layer 59 which, although preferable for savings in energy, will promote the possible occurrence of a hot spot where local heat generation is likely result from improper connection between die segments or from some other causes. To ensure temperature control over the entire length of the long-land die with safety, it is rather desirable that the insulating layer 59 be dispensed with.

The long-land die 24 can be made of any material insofar as it has the mechanical strength and heat resistance required of the forming and curing die and the electric resistance desired for the electric heating of the die. Examples of preferred materials are metals, especially iron and steel alloys such as stainless steel and carbon steel, having a volume resistivity of 1 to $10^3 \phi cm$, preferably 5 to $10^3 \phi cm$, more preferably 10 to $10^2 \phi cm$. The wall thickness of the long-land die 24, although depending on its length, is suitably about 3 to about 20 mm when the length is 1 to 20 m, or about 5 to about 25 mm if it is 20 to 50 m. The long-land die 24, when more than 5 m in the entire length, may be composed of a plurality of segments about 0.5 to about 3 m in length and joined together in series. The segments may be joined together in a known manner as with use of flanges or by screw-thread engagement. Although the resulting joint generally produces a variation in the electric resistance of the long-land die owing to the contact resistance, the resistance variation which will be involved in a joint of usually required strength is allowable. It is nevertheless desirable to provide a joint of increased area and enhanced fastness as when the terminals 26, etc, are attached to the die.

The power supply 31 must have an electric capacity sufficient to heat the section between the terminals 26 and 27 to the desired cross-linking temperature. Although variable with the distance between the terminals 26 and 27 and with the cross-linking temperature, the electric capacity is, for example, about 50 KW when the above-mentioned terminal to terminal distance is 10 m and the cross-linking temperature is 200° C., or about 150 KW for the terminal-to-terminal distance of 30 m and cross-linking temperature of 280° C. The voltage to be applied is preferably, up to 50 V, more preferably up to 30 V.

The curing apparatus 23 is connected, at its tapered portion, to a cross head 36 with screw 34 and is further connected, at the outlet end of its long-land die, to a water-cooling unit 40 by flanges with an electrically insulating member 57 provided therebetween. The cross head 36 incorporates a nipple 38 fixed in position by a holder 39 and communicates with the outlet of an extruder 35 incorporating a screw 37 therein.

Cross-linked shaped articles, for example, cross-linked polymeric material insulated wires, will be produced by the present apparatus in the following manner. A polymeric material, such as polyolefin containing an organic peroxide serving as a cross-linking agent, which is cross-linkable by heating is fed by the extruder 35 onto a conductor W which is continuously passing through the nipple 38, then through the curing apparatus 23 and thereafter through the water-cooling unit 40. A lubricant is applied to the inner surface of the long-land die 24 which is maintained at the required cross-linking temperature by being heated with application of voltage. The layer of polymeric material on the conductor W smoothly passes through the long-land die 24 along with the conductor W with the aid of the lubricant, while being cross-linked, and enters the water-cooling unit 40, in which the layer is cooled with high-pressure water 50, whereby a cross-linked polymeric material insulated wire 51 is produced.

This invention has the outstanding advantages to be described below. With reference to the graph given in the upper portion of FIG. 1, the full line 42 represents the temperature $T_2$ of the section between the terminals 26 and 27 when the section is maintained at that temperature uniformly over the entire length thereof. The dotted line 21 represents the temperature gradient produced by the conventional heating method in which voltage is impressed across the terminals 26 and 27. The temperature gradient occurs for the reason already described, whereas according to this invention the section between the terminals 26 and 27 can be adapted to have a temperature gradient approximate to that indicated by the line 42 for the reasons given below.

It is assumed that the electric resistance and current flowing between the terminals 26 and 28 and the quantity of heat electrically generated per unit length of the die therebetween are $R_1$, $i_1$ and $Q_1$ respectively and that the corresponding values between the terminals 28 and 27 are $R_2$, $i_2$ and $Q_2$ respectively. Since the long-land die 24 has a substantially uniform electric resistance longitudinally thereof, and since the distance between the terminals 26 and 28 is smaller than that between the terminals 28 and 27, $R_1$ is smaller than $R_2$. On the other hand, the potential difference between the terminals 26 and 28 is equal to that between the terminals 28 and 27, hence $i_1$ is greater than $i_2$. Thus, $Q_1$ is greater than $Q_2$. Accordingly the temperature gradient given by the present invention between the terminals 26 and 28 is more approximate to that represented by the full line 42 than that represented by the dotted line 21.

The polymeric material advancing through the curing apparatus can be cross-linked at a higher reaction velocity preferably by levelling off the distribution of temperatures throughout the long-land die section between the terminals 26 and 27 as indicated in the full line in FIG. 1 or by causing the section to have an increasing temperature toward the terminal 26. This can be achieved by positioning the intermediate terminal 28 closer to the terminal 26 to some extent than to the terminal 27. Assuming that the distance between the terminals 26 and 27 is 1, it is desirable that the intermediate terminal 28 be at a distance 3l/10 to 5l/10, more preferably 4l/10 to 5l/10, from the terminal 26.

While the curing apparatus of this invention is effective in curing polymeric materials at an increased velocity, the apparatus is also very useful in alleviating or eliminating the problems invariably encountered with the conventional curing apparatus of electric heating employed for the manufacture of insulated wires. With the conventional apparatus, sparks occur between the nipple 38 and the conductor W, causing damage to the forward end of the nipple or to the surface of the conductor W, or electrolytic corrosion develops in the outlet end wall of the long-land die 24.

When a.c. voltage is used in the conventional apparatus, induced voltage is generated on the conductor W which advances across the magnetic field generated around the long-land die, giving rise to sparks between the conductor W and the nipple 38 at the ground potential. When d.c. voltage is used in the conventional apparatus, the terminal at the outlet of the long-land die is generally employed as the positive terminal and the terminal at the inlet of the die as the negative one for the application of voltage, to ensure electrical insulation with safety in view of the fact that the insulating layer 45 exposed to a high temperature at all times has a shorter insulation life than the insulating layer 57 which is in contact with water. Since the water in the cooling unit 40 is usually conductive, an electric circuit will be formed between the outlet end wall of the die and the cooling unit which is at the ground potential, causing electrolysis of the cooling water and consequently giving rise to electrolytic corrosion in the end die wall acting as the positive terminal. The ragged corroded end wall of the die will deface the cured polymeric material.

With the apparatus of this invention, the a.c. voltage are applied at the intermediate terminal 28 dividedly to the inlet side (terminal 26 to terminal 28) and the outlet side (terminal 28 to terminal 27) with the result that the induced voltage generated on the conductor W by alternating current flow is the difference between that in the inlet side and that in the outlet side, hence very small, and problems due to spark can be alleviated or eliminated. Further when the intermediate terminal 28 is used as the positive terminal and the opposite end terminals 26 and 27 as the negative ones, for d.c. voltage application, the potential at the end terminals will not differ greatly from the ground potential, whereby the above-mentioned corrosion problem can be alleviated or overcome. Additionally because the potential at the inlet and outlet ends of the long-land die is closer to the ground potential than in the case of the conventional apparatus of electric heating, the insulation provided for the cross head which insulation involves relatively greater difficulty can be dispensed with. This is also the case with a.c. voltage and application.

The present invention affords another significant advantage of redering the lubricant serviceable for a prolonged period of time or permitting the use of a wider variety of lubricants for the following reason.

Generally in curing polymeric materials with use of the long-land die, the lubricant fed to the inner surface of the die is liable to react with an organic peroxide or like cross-linking agent migrated from the polymeric material, consequently failing to effect the desired lubrication. This detrimental tendency becomes more pronounced with an increase in the duration of the contact of the lubricant with the uncured polymeric material within the die, because an increasing quantity of the cross-linking agent would then migrate into the lubricant from the polymeric material and react therewith for a longer period of time. With the lubricant rendered no longer serviceable as such, the polymeric material would be unable to smoothly advance through the long-land die.

According to this invention, the location of the intermediate terminal is so adjustable that the vicinity of the inlet of the long-land die heating section can be maintained at the same temperature as, or a higher temperature than, the vicinity of the outlet thereof. Thus the polymeric material entering the long-land die can be heated and cross-linked more rapidly than in the conventional electric heating apparatus, permitting the cross-linking agent in the material to be consumed almost solely for the cross-linking of the material. This reduces the quantity of the agent which would migrate into the lubricant, thereby shortening the duration of the contact between the lubricant and the unreacted cross-linking agent.

The embodiment of FIGS. 1 to 3 is in no way limitative but is given for a better understanding of the invention. Thus various modifications of the invention will be apparent to one skilled in the art without departing from the spirit of the invention. In the case where a large temperature gradient similar to that represented by the dotted line 21 of FIG. 1 is produced by a certain reason at a long-land die having a substantially uniform electric resistance longitudinally, and, as a result, the electric resistance of inlet side of the die becomes lower than that of outlet side thereof owing to the temperature dependence of volume resistivity, one terminal of an power supply may be connected to the midpoint between the opposit ends whereat the other terminal of power supply is connected. Although the long-land die shown in FIG. 1 is adapted to be heated by applying voltage to the die substantially over the entire length thereof according to this invention, the heating system of this invention may be used only for at least one portion (e.g. for a localized low-temperature portion) of the long-land die for which the heating system is effective, with a known heating system, such as the conventional direct power application heating system of U.S. Pat. No. 2,616,126, employed for the remainder or remainders of the die. This invention is advantageously applicable also to curing tubes, other than the long-land die described, in which the space between the inner surface of the tube and the polymeric material to be cross-linked is adapted to be filled with a gas such as nitrogen or $SF_6$, or with a liquid such as silicone oil, ethylene oxide-propylene oxide-brock copolymer or a eutectic mixture of inorganic salts.

What we claim is:

1. A curing apparatus comprising a curing tube, means for heating the curing tube by the direct passage of electric current in the tube over part or the whole of its length, and a power supply provided for the heating means and having one terminal connected to the opposite ends of the voltage applying section of the tube and the other terminal connected to the tube at a position where the voltage applying section is divided into one portion on the inlet side of the tube and the other portion on the outlet side thereof, the inlet-side portion being lower than the outlet-side portion in electric resistance.

2. A curing apparatus as defined in claim 1 wherein the curing tube has a substantially uniform electric resistance longitudinally thereof, said one terminal of the power supply being connected to the curing tube substantially at the opposite ends thereof, said other terminal of the power supply being connected to the curing tube at the midpoint between the connected positions of said opposite ends or a position away from the midpoint toward the inlet of the curing tube.

3. A curing apparatus as defined in claim 2 wherein the connection of said other terminal to the tube is positioned at a distance of 3l/10 to 5l/10, preferably 4l/10 to 5l/10, from the connection of said one terminal to the inlet end of the tube, l being the distance between the connections of said one terminal to the tube ends.

4. A curing apparatus as defined in any one of claims 1 to 3 wherein the curing tube is a forming and curing long-land die.

* * * * *